(12) United States Patent
Rutkowski et al.

(10) Patent No.: US 7,351,290 B2
(45) Date of Patent: Apr. 1, 2008

(54) ROBOTIC PEN

(75) Inventors: Stephen Francis Rutkowski, Duanesburg, NY (US); Canan Uslu Hardwicke, Niskayuna, NY (US); Michael Francis Xavier Gigliotti, Scotia, NY (US); Melvin Robert Jackson, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 590 days.

(21) Appl. No.: 10/622,063

(22) Filed: Jul. 17, 2003

(65) Prior Publication Data

US 2005/0013926 A1 Jan. 20, 2005

(51) Int. Cl.
B05C 11/10 (2006.01)

(52) U.S. Cl. .............. 118/683; 118/684; 118/686; 118/695

(58) Field of Classification Search ........... 118/680, 118/681, 683, 684, 686, 695, 696, 697, 323, 118/DIG. 2, 320; 427/8, 9, 10; 700/117, 700/118, 121, 179
See application file for complete search history.

(56) References Cited

U.S. PATENT DOCUMENTS

| | | | |
|---|---|---|---|
| 3,561,398 A * | 2/1971 | Rose ..................... | 118/680 |
| 4,477,754 A | 10/1984 | Roch et al. | |
| 5,613,929 A | 3/1997 | Bayer | |
| 5,656,034 A | 8/1997 | Kochersperger et al. | |
| 5,717,599 A | 2/1998 | Menhennett et al. | |
| 5,727,296 A | 3/1998 | Kobler et al. | |
| 5,777,267 A * | 7/1998 | Szydel ..................... | 174/72 A |
| 5,833,147 A * | 11/1998 | Fuhlbrigge ............... | 239/587.5 |
| 5,890,656 A * | 4/1999 | Fuhlbrigge ............... | 239/227 |

(Continued)

FOREIGN PATENT DOCUMENTS

JP WO99/49987 * 10/1999

(Continued)

OTHER PUBLICATIONS

Haas Automation, Inc., "The Tool Room Mill, Quick Start Guide", Jul. 2001, brochure, 4 pages.

(Continued)

*Primary Examiner*—George Koch
(74) *Attorney, Agent, or Firm*—Fletcher Yoder

(57) ABSTRACT

A robotic pen includes a computer numerically controlled machine having a multiaxis stage for mounting a workpiece, and a cooperating elevator which translates relative thereto. A pen tip is rotatably mounted to the elevator. And, a dispenser is joined in flow communication with the pen tip for ejecting a stream of material atop the workpiece as the workpiece moves relative thereto for maintaining a substantially constant gap between said pen tip and the workpiece during relative movement therebetween.

18 Claims, 3 Drawing Sheets

U.S. PATENT DOCUMENTS

| | | |
|---|---|---|
| 5,916,524 A | 6/1999 | Tisone |
| 5,932,012 A * | 8/1999 | Ishida et al. ............... 118/669 |
| 6,039,375 A * | 3/2000 | Bauman ................. 294/119.1 |
| 6,095,729 A | 8/2000 | Pattison et al. |
| 6,197,115 B1 * | 3/2001 | Barrey et al. ............... 118/681 |
| 6,332,926 B1 | 12/2001 | Pfaendtner et al. |
| 6,360,562 B1 | 3/2002 | Kodas et al. |
| 6,401,795 B1 | 6/2002 | Cesarano, III |
| 6,562,406 B1 * | 5/2003 | Chikahisa et al. .......... 427/256 |
| 2002/0001675 A1 | 1/2002 | Tisone |
| 2002/0045861 A1 | 4/2002 | Woo |
| 2002/0077233 A1 | 6/2002 | Oldani |
| 2002/0112821 A1 * | 8/2002 | Inaba et al. ................. 156/359 |
| 2002/0136613 A1 | 9/2002 | Tidwell |

FOREIGN PATENT DOCUMENTS

| | | |
|---|---|---|
| WO | WO84/01825 | 5/1984 |

OTHER PUBLICATIONS

Harvard Apparatus Co., "Harvard PHD 2000 Advanced Syringe Pumps", date 2001 brochure, 2 pages.

Syringepump.com, "Multi-phaser Model: NE-1000", Jan. 28, 2002, brochure, 42 pages.

OhmCraft, Inc., "Model 400a User's Manual", Dec. 2000, 144 pages.

* cited by examiner

ROBOTIC PEN

BACKGROUND OF THE INVENTION

The present invention relates generally to manufacturing and repairing of articles, and, more specifically, to dispensing or writing a material stream in desired patterns.

Manufactured parts or workpieces are found in myriad configurations from simple two-dimensional (2D) flat plates to complex bodies varying in curvature or contour in three dimensions (3D). Correspondingly, various types of machines are available for the manufacture and repair thereof including simple single-axis machines to complex multiaxis computer numerically controlled (CNC) machines.

These various machines typically remove material by cutting, whereas other machine add material by welding, brazing, or deposition. In one form of material deposition, a line or stream of material is deposited or written on a flat surface in predetermined patterns from simple lines to complex grids.

In one commercially available apparatus, a flat substrate, such as an electronic component, is mounted on a two-dimensional table which moves relative to a dispensing nozzle or pen. A stream of material is dispensed from the pen as the workpiece is suitably moved under computer control for producing thin films of material which are suitably cured or hardened atop the workpiece.

In one exemplary application it is desired to form thermocouples on a part for measuring temperature during testing thereof. If the part is flat, the 2D pen system may be used for writing the thermocouple material in suitable lines atop the part and cured for bonding therewith. However, if the part has a complex 3D configuration with varying curvature, it is difficult if not impossible to dispense the material stream along the curved surfaces thereof, and therefore relatively flat portions of the part must be used instead. This limits the ability to place the thermocouples where desired.

Accordingly, it is desired to provide a material dispensing or writing system specifically configured for three dimensional workpieces.

BRIEF DESCRIPTION OF THE INVENTION

A robotic pen includes a computer numerically controlled machine having a multiaxis stage for mounting a workpiece, and a cooperating elevator which translates relative thereto. A pen tip is rotatably mounted to the elevator. And, a dispenser is joined in flow communication with the pen tip for ejecting a stream of material atop the workpiece as the workpiece moves relative thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
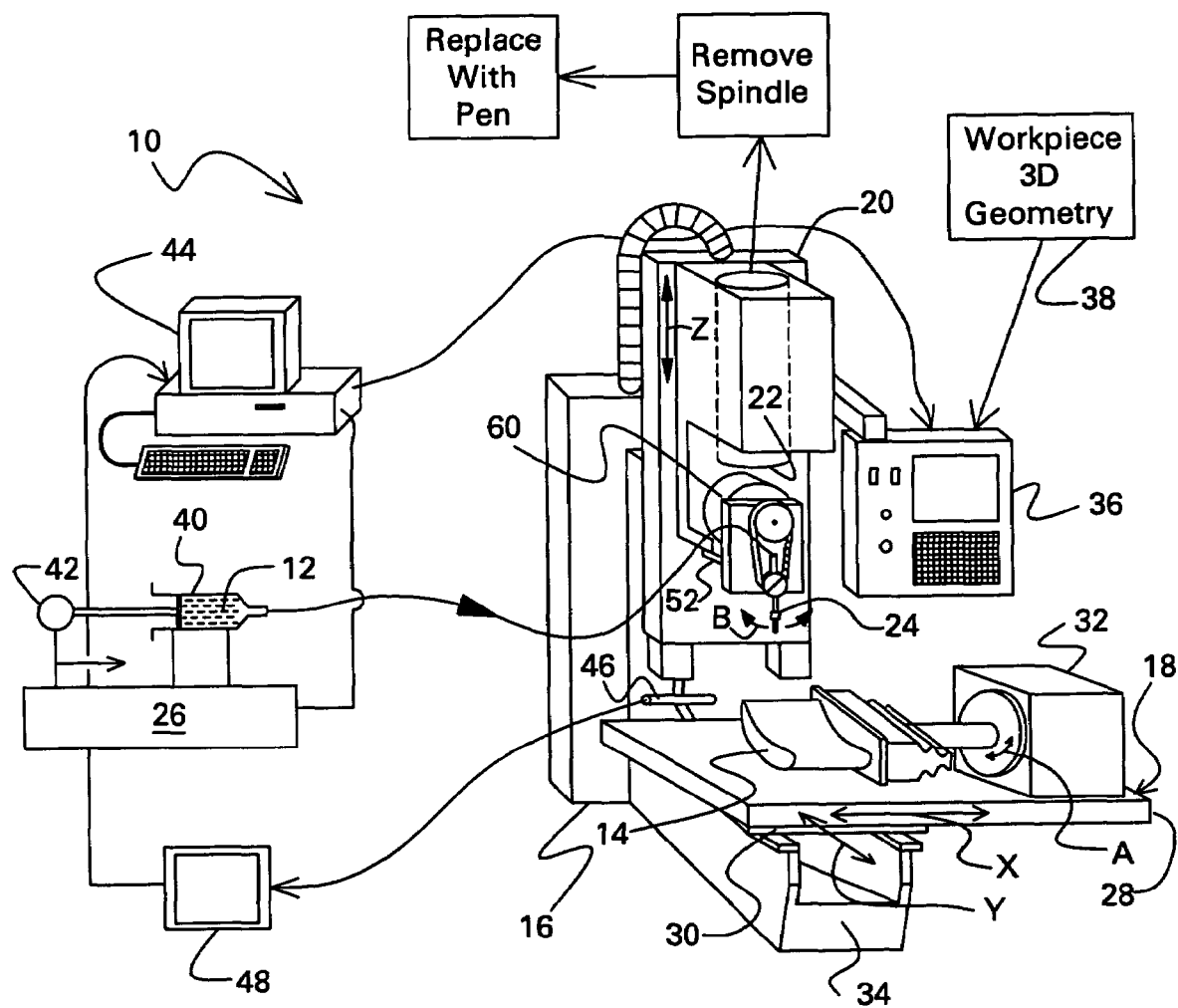
FIG. 1 is a schematic representation of a robotic pen in accordance with an exemplary embodiment for writing a material stream atop the workpiece mounted therein.

Illustrated schematically in FIG. 1 is a robotic pen 10 specifically configured for dispensing or writing any suitable material 12 in a stream atop the surface of any suitable workpiece 14. In particular, the workpiece may have a simple 2D configuration such as a flat plate, yet more commonly will have a complex 3D configuration with varying curvature or change in contour along its three axes.

Figure 2:
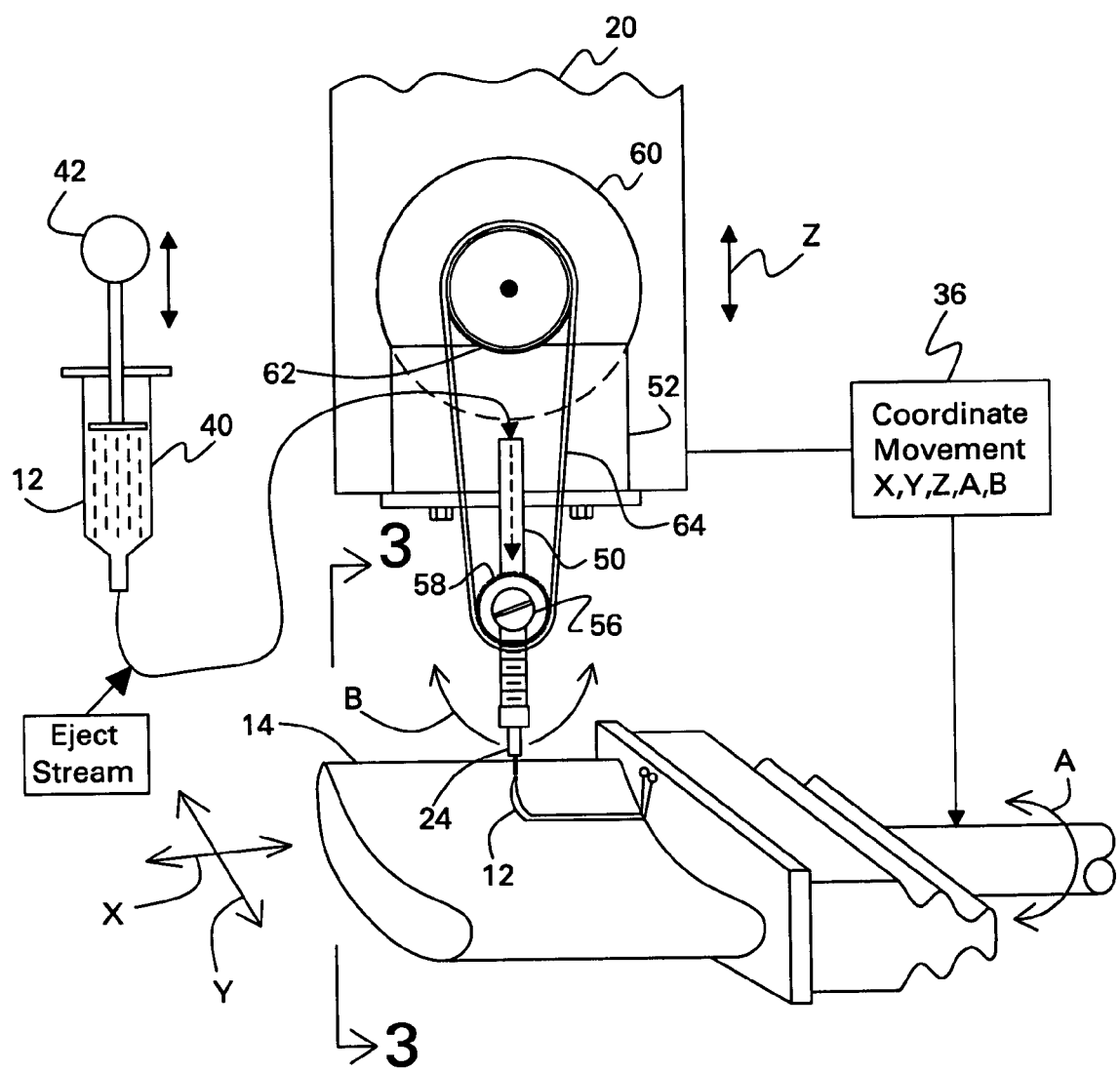
FIG. 2 is an enlarged front view of a portion of the robotic pen illustrated in FIG. 1 with the pen tip disposed closely adjacent to the workpiece mounted for movement relative thereto.

The exemplary workpiece 14 is illustrated in FIG. 2 in more detail in the form of a turbine blade including an arcuate airfoil having a generally concave pressure side and generally convex opposite suction side extending outwardly from a flat platform having a typical retention dovetail therebelow.

The robotic pen illustrated in FIG. 1 is an assembly of primarily conventional components suitably modified in a collective apparatus or system for writing with precision on the various surfaces of the 3D workpiece 14 for any suitable purpose, such as original manufacture, repair, or modification as further described hereinbelow in a preferred embodiment. A main component of the robotic pen is an initially conventional computer numerically controlled (CNC) milling machine 16 having multiple axis motion capability. The machine may have any suitable configuration and is preferably a pre-existing machine which is commercially available.

The conventional machine includes a three axis stage 18 for mounting the workpiece sample 14 for two-axis (X,Y) precision translation and precision rotation (A) relative thereto. The machine also includes a conventional elevator 20 on which is mounted a conventional rotary spindle 22, shown in part, in which various milling machine tools may be interchanged for use in typical milling of workpieces. The elevator introduces a vertical axis (Z) of translation relative to the workpiece stage 18, with the three axes of translation (X,Y,Z) and one rotary axis (A) being conventionally used for performing milling of various 3D workpieces.

However, the machine 16 is conveniently modified in constructing the robotic pen by removing most if not all of the conventional milling tool spindle 22 from the elevator, and replacing the spindle with a rotary pen tip or nozzle 24 which is suitably rotatably mounted to the elevator 20.

Means in the form of a conventional dispenser 26 are suitably joined in flow communication with the pen tip 24 for ejecting desired material 12 in a stream atop the workpiece for writing thereon any suitable pattern of material under relative movement between the pen tip and the workpiece mounted to the stage 18.

As indicated above, the workpiece stage 18 illustrated in FIG. 1 may have any conventional configuration including a first table 28 for translating the workpiece in a first linear axis X, and a second table 30 mounted atop the first table for translating the first table and workpiece in a second linear axis Y. The second axis Y is orthogonal to the first axis X for two-plane mounting and translation of the workpiece 14 in a conventional manner. For example, the two tables 28,30 typically include precision driving internal lead screws for accurate translation thereof.

The CNC machine 16 also includes a precision driven rotary spindle 32 suitably mounted atop the first table 28 for mounting the workpiece thereto for precision rotation thereof in a first rotary axis A.

The pen tip 24 is suitably mounted to the vertical elevator 20 for translation thereof in a third linear axis Z which is orthogonal to the X and Y axes. And, the pen tip 24 is also mounted to the elevator for rotation in a second rotary axis B which permits full 360 degree movement of the pen for reaching either the external surface of the workpiece 14, or the internal surface of a different hollow workpiece as desired.

The stage 18 and the elevator 20 of the exemplary machine illustrated in FIG. 1 are joined to a common structural frame 34 which permits relative movement between the pen tip and the workpiece. The machine also includes a conventional digitally programmable computer or controller 36 which is conventionally configured in software for controlling all motion axes of the machine including the relative movement of the pen tip 24 mounted on the elevator and the workpiece mounted on the movable stage 18 as the material stream 12 is dispensed from the pen tip.

In particular, the controller 36 is effective for controlling and coordinating relative movements along the three linear axes X,Y,Z and the two rotary axes A,B. The two rotary axes of the pen tip 24 and workpiece spindle 32 permit accurate alignment and orientation of the pen tip on the varying 3D surface of the workpiece upon which the stream is written in the desired pattern. In particular, it is desired to coordinate the movement of the pen tip and workpiece for orienting the pen tip obliquely and substantially perpendicular with the local target surface of the workpiece which receives the material stream.

A particular benefit of the robotic pen 10 illustrated in FIG. 1 is its manufacture from mostly conventional components such as a CNC milling machine commercially available from various companies, such Haas Automation, Inc., Oxnard, Calif., under the exemplary model TM-1 Tool Room Mill. This basic machine is provided with a five-axis controller 36 for controlling the linear axes of the two-axis stage 18 and the third axis elevator.

The workpiece support spindle 32 is an optional feature also commercially available from the same company and introduces the first rotary axis A which is also controlled by the common controller 36. And, the controller 36 includes yet another, fifth, axis control capability available for optional use. That fifth axis capability is readily used in the robotic pen configuration for precision control of the pen tip 24 as further described hereinbelow. Accordingly, the five-axis controller 36 is integral with the original CNC machine 16, and may be used to advantage for controlling the pen tip 24 mounted to the elevator upon removal of most if not all of the original spindle 22 provided with the pre-existing machine.

In a preferred embodiment, the pen tip 24 is mounted on the elevator 20 along the original vertical centerline of the rotary spindle thereof in which the conventional machine cutting tools would be mounted. In this way, the inherent coordination features of the milling machine may be used to advantage for coordinating the relative movement of the pen tip and the workpiece mounted on the stage.

For example, the controller 36 may be configured in suitable software with the three-dimensional geometry or configuration 38 of the workpiece 12, and a corresponding predetermined path or pattern for the pen tip across the workpiece. In conventional operation of the CNC machine, the controller is programmed with the 3D geometry of the workpiece and the corresponding cutting paths for the milling tool for achieving the final 3D shape or configuration of the workpiece from a larger blank of workpiece material.

Similarly, in the same manner that the machine may be programmed to follow the 3D geometry of the workpiece during cutting to its final configuration, the machine may also be programmed to have the pen tip 24 follow any desired region of the surface of the workpiece, and thereby dispense or write the material stream thereon as desired.

The controller 36 may therefore be programmed in any conventional manner using the original program previously used to machine the specific workpiece. Alternatively, the 3D geometry of the workpiece may be generated and stored in the controller using a conventional coordinate measurement machine (CMM), or the CMM capabilities of the milling machine 16 itself may be used. And in yet another option, the 3D geometry of the workpiece may be obtained from a CAD/CAM program specifically used for defining the workpiece.

With the controller containing the 3D geometry of the specific workpiece mounted on the stage 18, the desired pen path or pattern for the written stream may then be generated either analytically using the software capability of the machine, or manually by repositioning the pen tip along the desired path on the workpiece and recording the path in the controller using the inherent capabilities thereof.

In the exemplary embodiment illustrated in FIG. 2, the 3D geometry of the workpiece 14 is stored in the controller 36 for coordinating movement between the pen tip 24 and the workpiece in the five axes X,Y,Z,A,B. The material stream 12 is in the exemplary configuration of a suitable electrically conductive powder suspended in a liquid for forming a corresponding writing ink which can be written atop the external surface of the workpiece airfoil 14 for forming an electrically conductive thermocouple and corresponding electrical leads where desired.

For example, thermocouples are well known, and can be defined at the junction of two electrical leads located on the concave surface of the airfoil near the thin trailing edge thereof, with the electrical leads being drawn firstly along the chord direction of the airfoil and then radially inwardly along the span to the blade platform at which electrical connections may be conveniently made. The formation of the thermocouple and its electrical leads is merely an exemplary use of the robotic pen and its ability to draw lines or patterns of any suitable form on either the external surface of the workpiece or the internal surface of hollow workpieces for any application requiring precision pattern writing.

The versatility of the robotic pen matches the original capability of the 2D writing pen described above in the Background section for all corresponding applications, yet introduces additional versatility for complex 3D workpieces for which the 2D writing pen would be ineffective or impractical.

The dispenser 26 illustrated schematically in FIG. 1 may itself have any conventional configuration, such as the commercially available Harvard PHD 2000 Advanced Syringe Pump commercially available from the Harvard Apparatus Company. Holliston, Mass. The dispenser includes a syringe 40 having a suitable reservoir for initially storing the desired writing material 12, with the syringe being suitably joined in flow communication with the pen tip 24, by a flexible conduit, for example.

The dispenser further includes suitable means 42 in the form of computer controlled actuator for precision pumping of the syringe to dispense the material from the syringe and through the conduit for ejection from the pen tip 24. In this way, precise control of the material stream from the pen tip may be obtained for precisely controlling the width and height of the material line being dispensed from the tip and written upon the workpiece.

As indicated above, the precision dispenser 26 may itself be a conventional component including its own internal digital processor or controller which may be readily combined with the CNC machine 16. In order to coordinate the operation of the dispenser with the travel of the pen tip 24, a conventional personal computer (PC) 44 may be suitably joined to the dispenser 26 and the CNC controller 36 for coordinating operation thereof.

More specifically, the PC 44 may be suitably programmed for coordinating dispensing of the material 12 from the dispenser 26 with the relative movement between the pen tip 24 and the workpiece 14 in the CNC machine to control flowrate of the material stream from the pen tip. In this way, the written stream 12 from the pen tip may be precisely located on the workpiece 14, and have a precise width and height determined by the flowrate of the dispensed stream, and the relative speed of movement between the pen tip and the workpiece during the writing operation.

FIGS. 1 and 2 illustrate schematically an exemplary method of using the robotic pen apparatus 10 in which the workpiece 12 is mounted to the stage 18 using a suitable fixture clamping the workpiece into the collet of the supporting spindle 32. As indicated above, the 3D geometry of the workpiece is suitably stored in the CNC controller 36, along with the desired path of the pen tip such as that associated with the thermocouple and electrical leads illustrated in FIG. 2. The machine is then operated for coordinating relative movement between the pen tip 24 and the workpiece 14 to preferably position the tip closely adjacent to but not touching the workpiece surface. Any suitable gap between the pen tip and the workpiece may be maintained with precision, with relatively small gaps being preferred on the order of about a millimeter.

Furthermore, the pen tip 24 is preferably oriented obliquely and substantially perpendicular with the target surface of the workpiece on which the material stream is being deposited or written. In this way, the stream 12 may be ejected from the pen tip 24 directly atop the workpiece in a direct-write deposition process. As the stream is dispensed from the pen tip, the workpiece 14 is moved by the supporting stage relative to the tip for writing or applying a line of the material atop the workpiece in any desired pattern. The resulting line or pattern of material enjoys precision location on the workpiece and precision of width and thickness and may be used for any desired application in manufacturing, repairing, or alteration of workpieces for any desired purpose.

Figure 3:
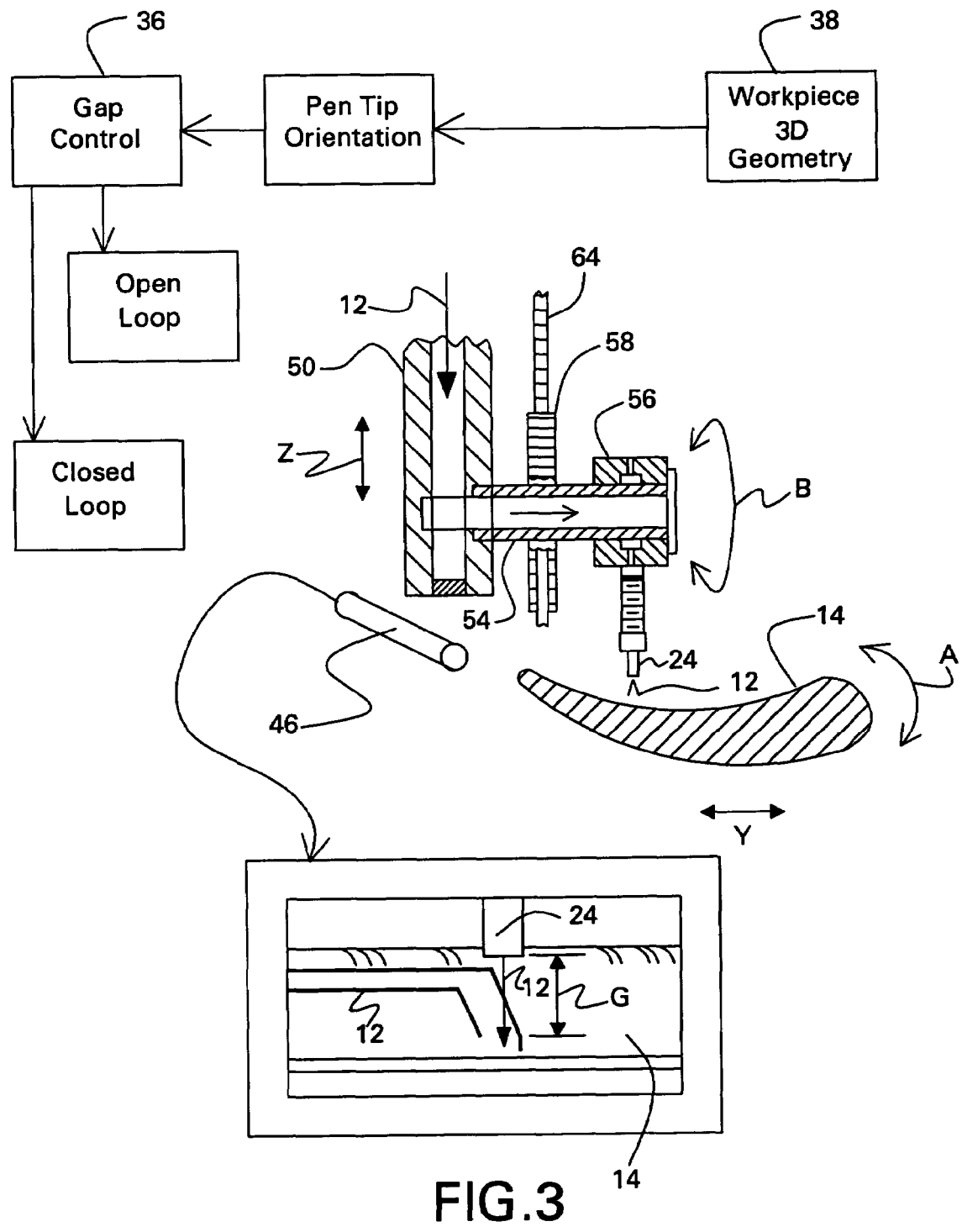
FIG. 3 is an elevational, sectional view of a portion of the pen writing assembly illustrated in FIG. 2 and taken along line 3-3 in conjunction with a viewing monitor therefor.

As additionally illustrated in FIG. 3, the robotic pen is preferably used for maintaining a substantially constant gap G between the pen tip 24 and the workpiece 14 during relative movement therebetween. In addition to the translation movement between the pen tip and workpiece, the rotary movement capability of the workpiece around the first rotary axis A and the pen tip around the second rotary axis B improves the versatility of writing the material stream on the varying contour of the 3D workpiece, yet while maintaining the preferred small gap G therebetween.

In a simple control process using the robotic pen, the gap G may be maintained substantially constant in open-loop control based solely on the 3D geometry of the workpiece stored in the CNC controller, along with the desired path of the pen tip which includes a predetermined spatial gap from the workpiece surface. However, the actual size of the gap G is subject to typical manufacturing tolerances reflected in the 3D configuration of the workpiece stored in the controller, with the gap therefore being subject to corresponding variation as the workpiece surface is driven past the pen tip.

Accordingly, the gap G may be maintained substantially constant with improved precision by using closed loop feedback control thereof conventionally introduced into the CNC controller. Feedback control may be introduced in any suitable manner in which the gap G is measured during the writing process and actively adjusted to the desired value thereof, which in turn accurately controls the thickness of the material stream being deposited.

Feedback control may be introduced using typical measurement devices based on laser, sonic, magnetic field, or advancing-roller touching. In the exemplary embodiment illustrated in FIGS. 1 and 3, a conventional charge coupled device (CCD) camera 46 is suitably mounted in the machine for visually observing the gap between the pen tip 24 and the workpiece 14 during operation. The camera 46 may be suitably joined to a viewing monitor 48 which allows the machine operator to view the pen tip and gap with suitable magnification for use in setting up the machine and controlling its operation.

The output of the camera 46 is suitably joined to the PC 44 which is used in conjunction with the CNC controller 36 for introducing the active, feedback control of the gap G between the pen tip and the workpiece during operation. Suitable recognition software is provided in the PC to measure the tip gap G for feedback control thereof.

As indicated above, the robotic pen apparatus illustrated schematically in FIG. 1 is an assembly of primarily conventional components suitably modified. The CNC machine 16 is conventional with its conventional digital processor or controller 36. The syringe dispenser 26 is also conventional with its internal digital controller or processor. And, the personal computer 44 is also conventional. Both the CNC controller 36 and the controller of the dispenser 26 are conventionally configured to cooperate with an external computer, such as the personal computer 44, which is used to advantage for coordinating operation of the CNC machine and dispenser, which also permits feedback control using the camera 46 suitably joined to the personal computer.

However, the robotic pen system illustrated in FIG. 1 could otherwise be custom designed with a single digital controller suitably configured for controlling the various components thereof and coordination required for precision direct writing of the material stream on any workpiece, particularly including 3D workpieces having contours varying in all three axes.

The rotatable pen tip 24 illustrated schematically in FIGS. 1-3 is a significant addition and modification of the otherwise conventional components of the robotic pen system which permits precision writing of the material stream on the workpiece. In the preferred embodiment, the pen tip 24 has a single axis of rotation B for suitably changing its orientation within the 360 degree range. The pen tip is also mounted to the elevator 20 for coordinated relative movement with the workpiece 14 mounted to the stage 18. Accordingly, the pen tip 24 may achieve its rotary flexibility in various configurations using conventional components and capabilities.

In the preferred embodiment illustrated in FIGS. 2 and 3, the elevator 20 includes a vertical tube or conduit 50 suitably fixedly mounted to the elevator, and suitably disposed in flow communication with the dispenser by a flexible conduit joined to the syringe 40. The vertical tube 50 is fixedly mounted to a subframe 52 which in turn is fixedly mounted to the elevator in place of the conventional machining spindle otherwise found therein.

A tubular horizontal shaft 54 is fixedly mounted to the vertical tube 50 in flow communication therewith for channeling the material stream 12 to the pen tip 24.

A manifold disk 56 is rotatably mounted around the horizontal shaft 54 in flow communication therewith, and the pen tip 24 is tubular and extends radially outwardly from the disk in flow communication therewith. In this way, the pen tip is rotatably mounted to the horizontal shaft 54 and the vertical shaft 50 for receiving the material stream therefrom.

And, suitable means are provided for precision rotating the manifold disk 56 on the shaft 54 in the second rotary axis B for positioning the pen tip relative to the rotary spindle 32 of the mounting stage and the workpiece supported therein.

The pen tip may be rotated in any suitable manner, and in one embodiment a first cog wheel 58 is fixedly joined coaxially with the manifold disk 56, and rotatably mounted to the horizontal shaft 54. An electrical stepper motor 60 is fixedly mounted to the elevator on the common frame 52, and includes a second cog wheel 62 suitably mounted to the output shaft thereof. And, a cog belt 64 joins together the first and second cog wheels.

The motor 60 is in turn electrically joined to the controller 36 illustrated in FIG. 1 for controlling the rotary position of its output shaft, and in turn the rotary position of the pen tip 24. In this way, the pen tip may be precisely indexed in rotary position about the second rotary axis B for coordinated movement with the workpiece 14 and its rotary position about the first rotary axis A, subject to relative translation along the three orthogonal axes X,Y,Z.

In the exemplary configuration illustrated in FIGS. 2 and 3, the two rotary axes A,B are orthogonal or perpendicular to each other, with the first rotary axis A rotating the workpiece relative to the pen tip 24, and the second rotary axis B rotating the pen tip in a different axis from the workpiece for permitting various relative orientations therebetween for maintaining the pen tip substantially perpendicular with the target surface of the workpiece as it is moved for writing a corresponding line thereon.

The five-axis robotic pen disclosed above in a preferred embodiment therefore permits the writing pen tip 24 to be accurately positioned substantially normal to the writing surface of the workpiece irrespective of its changing contour in three dimensions for precisely writing a material stream thereon in controlled thickness, position, and pattern. In the exemplary embodiment illustrated in FIG. 2, the pen tip is positioned for writing upon the external surface of the exemplary workpiece. In alternate embodiments, the pen tip may be positioned for writing upon the internal surface of a hollow workpiece within the reach of the pen tip.

The pen tip may be as short or as long as practical or required for the intended workpieces being processed. In FIG. 2, the pen tip is mounted by a retention collet to a threaded post extending radially outwardly from the manifold disk, which permits ready replacement of the pen tip with different configurations and lengths thereof as desired.

By the simple introduction of a separately movable pen tip in the otherwise conventional CNC machine 16, the resulting robotic pen 10 provides enhanced capability for accurately writing and dispensing any suitable material on a workpiece. The material may have any form configured for flowing through the pen tip in a liquid, paste, or slurry. The material itself may have these properties, or the material be a solid suspended in a suitable carrier fluid or liquid as desired. Finely detailed deposits of the material may therefore be written in any desired pattern on workpieces irrespective of their complex 3D configuration, and may therefore be used in any suitable manufacturing, repair, or other process desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A robotic pen comprising:
   a machine including a stage for mounting a workpiece for rotation and orthogonal translation, the said stage permitting translation generally in a plane and rotation about an axis generally parallel to said plane, and an elevator for translation from said stage;
   a pen tip rotatably mounted to said elevator;
   a dispenser joined in flow communication with said pen tip for ejecting a stream of material atop said workpiece; and
   a digital controller configured for coordinating relative movement of said pen tip and said stage, and dispensing of said stream from said pen tip.

2. A robotic pen according to claim 1 wherein said dispenser comprises:
   a syringe for storing said material, and joined in flow communication with said pen tip; and
   means for pumping said syringe to dispense material through said pen tip.

3. A robotic pen according to claim 2 wherein said controller is configured with a three dimensional geometry of said workpiece and a predetermined path for said pen tip thereacross.

4. A robotic pen according to claim 3 wherein:
   said stage includes a first table for translating said workpiece in a first linear axis, a second table for translating said workpiece in a second linear axis orthogonal to said first linear axis, and a spindle for rotating said workpiece in a first rotary axis; and
   said pen tip is mounted to said elevator for translation in a third linear axis orthogonal to said first and second linear axes, and for rotation in a second rotary axis coordinated with said first rotary axis for orienting said pen tip obliquely with said workpiece.

5. A robotic pen according to claim 4 further comprising:
   a vertical tube fixedly mounted thereto, and disposed in flow communication with said dispenser;
   a tubular shaft fixedly mounted to said tube in flow communication therewith;
   a manifold disk rotatably mounted around said shaft in flow communication therewith, and having said pen tip extending radially outwardly therefrom; and
   means for rotating said disk on said shaft in said second rotary axis for positioning said pen tip relative to said spindle.

6. A robotic pen according to claim 5 wherein said disk rotating means comprise:
   a first cog wheel joined to said disk, and rotatably mounted to said shaft;
   a motor fixedly mounted to said elevator and including a second cog wheel mounted to an output shaft thereof; and a cog belt joining together said first and second cog wheels.

7. A robotic pen comprising:
a computer numerically controlled machine including a stage for mounting a workpiece for rotation and orthogonal translation, the said stage permitting translation generally in a plane and rotation about an axis generally parallel to said plane, and an elevator for translation from said stage;
a pen tip rotatably mounted to said elevator; and
a dispenser joined in flow communication with said pen tip for ejecting a stream of material atop said workpiece.

8. A robotic pen according to claim 7 wherein:
said stage includes a first table for translating said workpiece in a first linear axis, a second table for translating said workpiece in a second linear axis orthogonal to said first linear axis, and a spindle for rotating said workpiece in a first rotary axis; and
said pen tip is mounted to said elevator for translation in a third linear axis orthogonal to said first and second linear axes, and for rotation in a second rotary axis coordinated with said first rotary axis for orienting said pen tip obliquely with said workpiece.

9. A robotic pen according to claim 8 wherein said elevator includes:
a vertical tube fixedly mounted thereto, and disposed in flow communication with said dispenser;
a tubular shaft fixedly mounted to said tube in flow communication therewith;
a manifold disk rotatably mounted around said shaft in flow communication therewith, and having said pen tip extending radially outwardly therefrom; and
means for rotating said disk on said shaft in said second rotary axis for positioning said pen tip relative to said spindle.

10. A robotic pen according to claim 9 wherein said disk rotating means comprise:
a first cog wheel joined to said disk, and rotatably mounted to said shaft;
a motor fixedly mounted to said elevator and including a second cog wheel mounted to an output shaft thereof; and
a cog belt joining together said first and second cog wheels.

11. A robotic pen according to claim 8 further comprising a digital controller configured for coordinating relative movement of said pen tip and said spindle in said first, second, and third linear axes and said first and second rotary axes.

12. A robotic pen according to claim 11 wherein said five axis controller is integral with said machine, and said machine is a pre existing milling machine modified by removing from said elevator the milling spindle thereof and replaced by said pen tip rotatably mounted thereto.

13. A robotic pen according to claim 11 wherein said controller is configured with a three dimensional geometry of said workpiece and a predetermined path for said pen tip thereacross.

14. A robotic pen according to claim 8 wherein said dispenser comprises:
a syringe for storing said material, and joined in flow communication with said pen tip; and
means for pumping said syringe to dispense material through said pen tip.

15. A robotic pen according to claim 14 further comprising means for coordinating dispensing of said material from said dispenser with relative movement between said pen tip and workpiece to control flow rate of said stream from said pen tip.

16. A robotic pen comprising:
a machine including a stage for mounting a workpiece for rotation and orthogonal translation, the said stage permitting translation generally in a plane and rotation about an axis generally parallel to said plane, and an elevator for translation from said stage;
a pen tip rotatably mounted to said elevator for rotation about an axis generally parallel to said plane;
a dispenser joined in flow communication with said pen tip for ejecting a stream of material atop said workpiece; and
a digital controller configured for coordinating relative movement of said pen tip and said stage, and dispensing of said stream from said pen tip.

17. A robotic pen according to claim 16 wherein:
said stage includes a first table for translating said workpiece in a first linear axis, a second table for translating said workpiece in a second linear axis orthogonal to said first linear axis, and a spindle for rotating said workpiece in a first rotary axis; and
said pen tip is mounted to said elevator for translation in a third linear axis orthogonal to said first and second linear axes, and for rotation in a second rotary axis coordinated with said first rotary axis for orienting said pen tip obliquely with said workpiece.

18. A robotic pen according to claim 17 further comprising:
a vertical tube fixedly mounted thereto, and disposed in flow communication with said dispenser;
a tubular shaft fixedly mounted to said tube in flow communication therewith;
a manifold disk rotatably mounted around said shaft in flow communication therewith, and having said pen tip extending radially outwardly therefrom; and
means for rotating said disk on said shaft in said second rotary axis for positioning said pen tip relative to said spindle.

* * * * *